No. 670,424. Patented Mar. 26, 1901.
B. GRANVILLE.
WIRE DRAWING MACHINE.
(Application filed Feb. 26, 1900.)
(No Model.) 4 Sheets—Sheet 1.
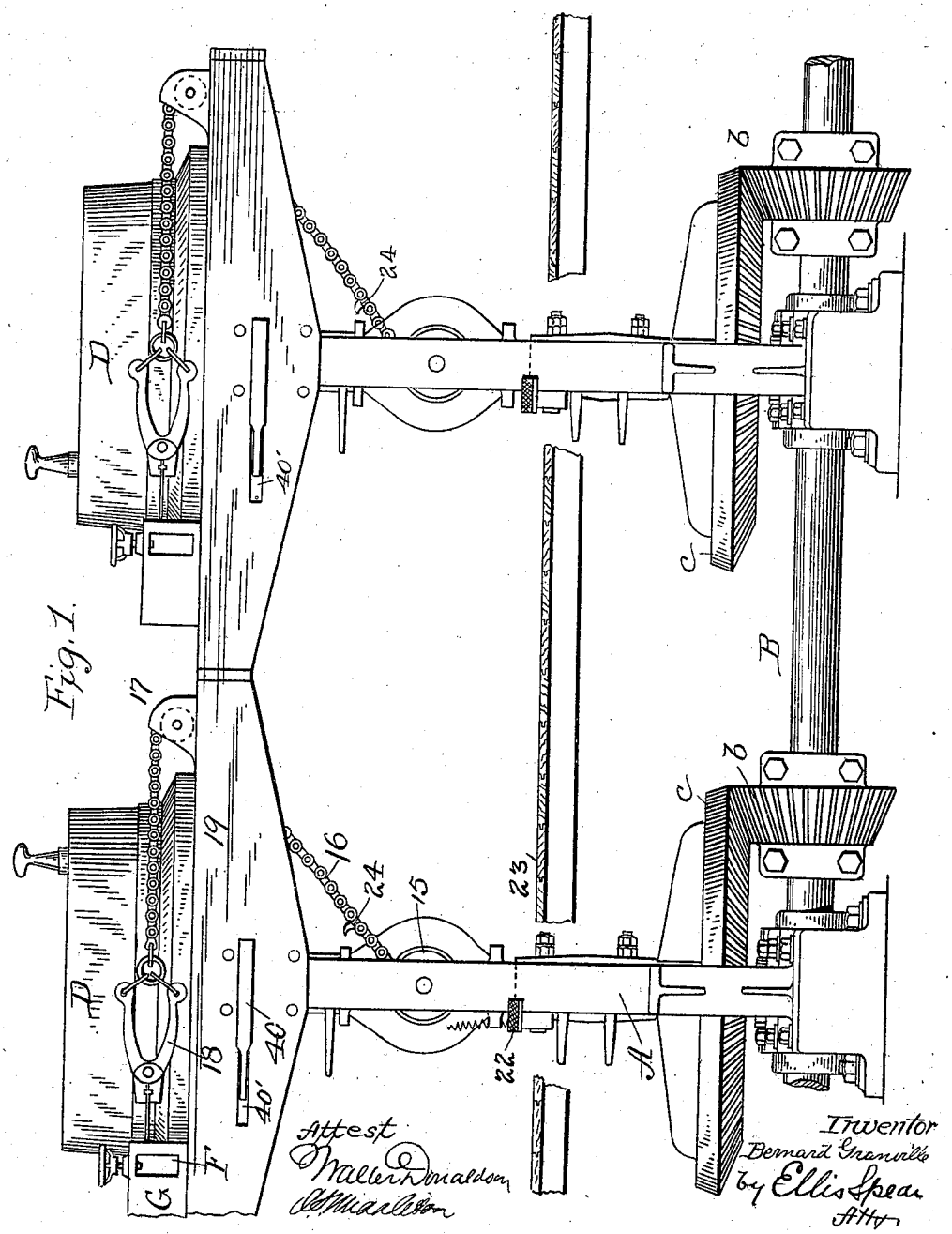

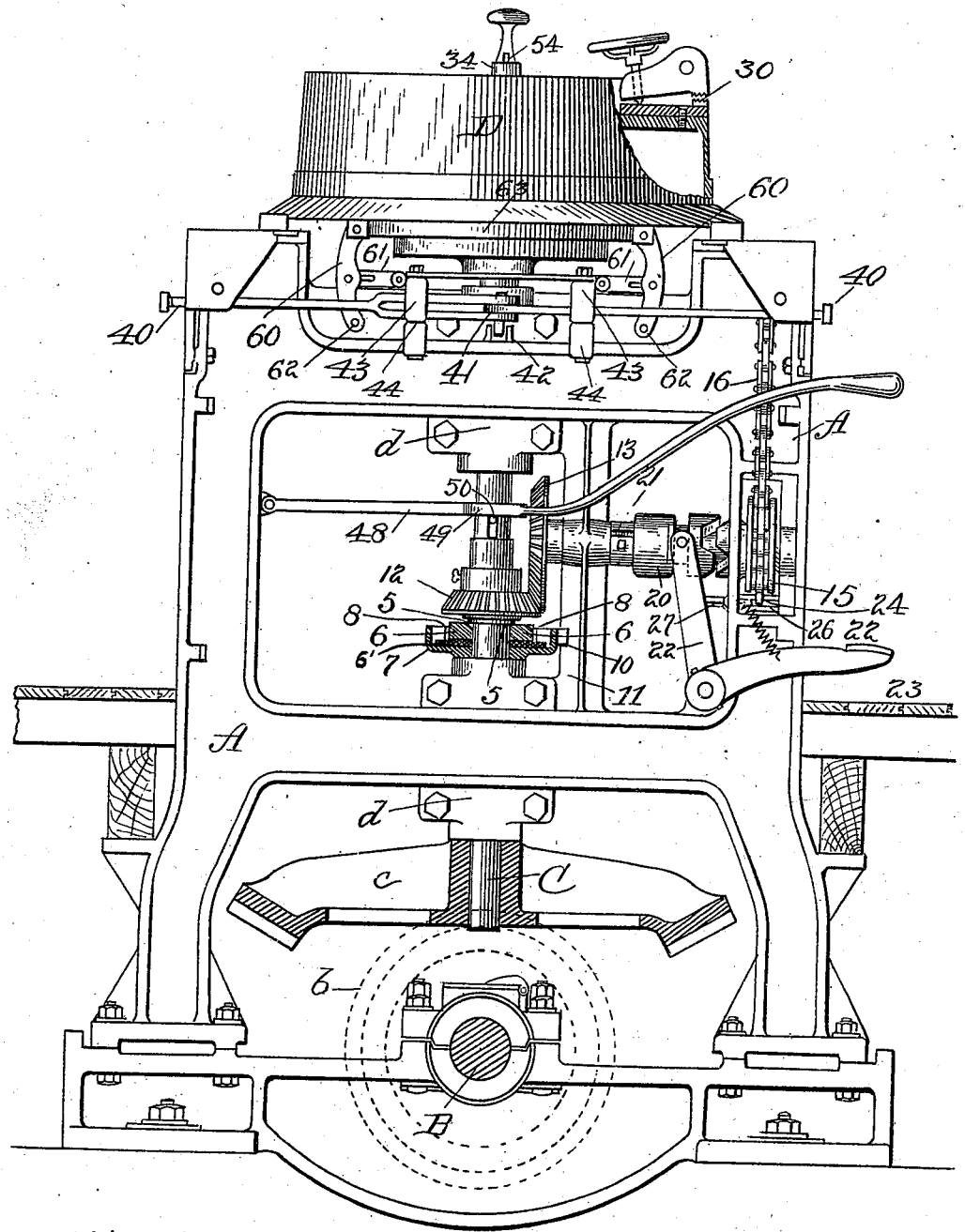

No. 670,424. Patented Mar. 26, 1901.
B. GRANVILLE.
WIRE DRAWING MACHINE.
(Application filed Feb. 26, 1900.)
(No Model.) 4 Sheets—Sheet 3.
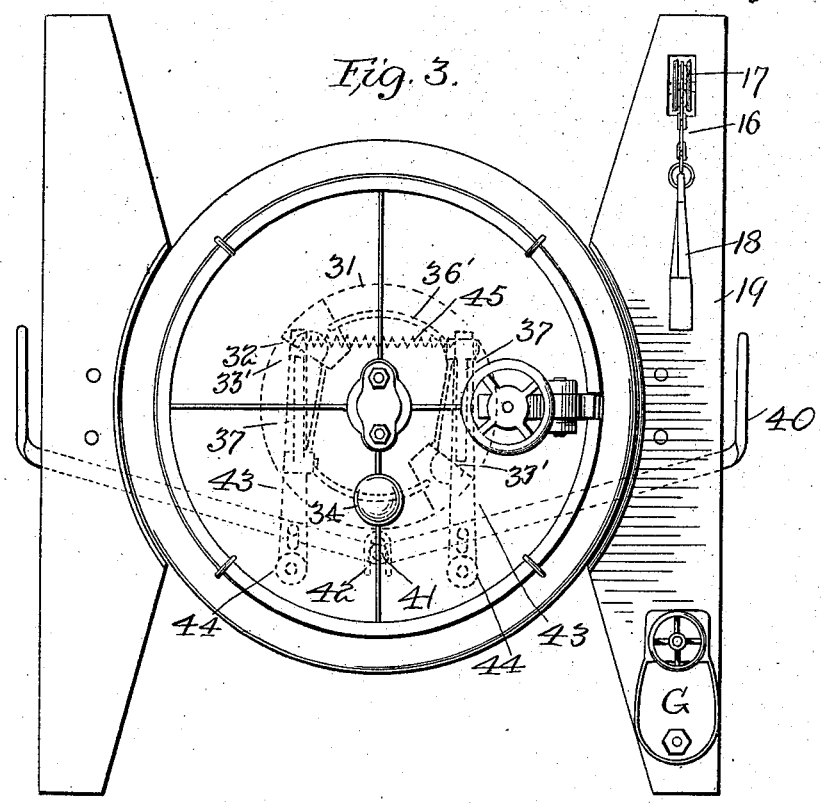
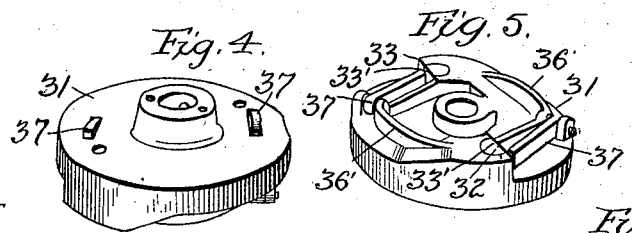
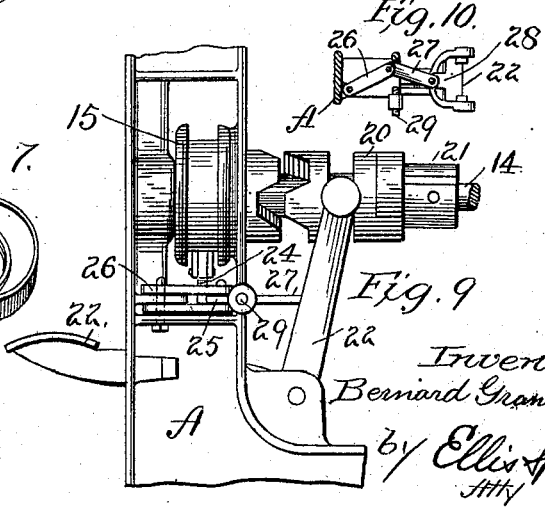

No. 670,424. Patented Mar. 26, 1901.
B. GRANVILLE.
WIRE DRAWING MACHINE.
(Application filed Feb. 26, 1900.)
(No Model.) 4 Sheets—Sheet 4.
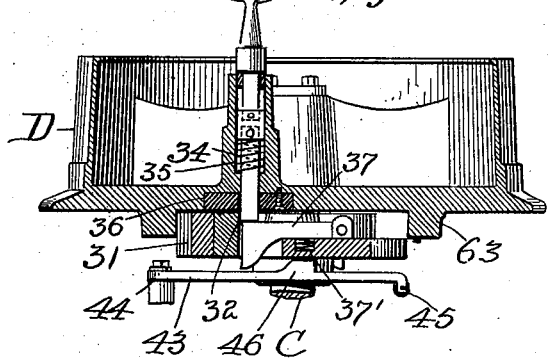
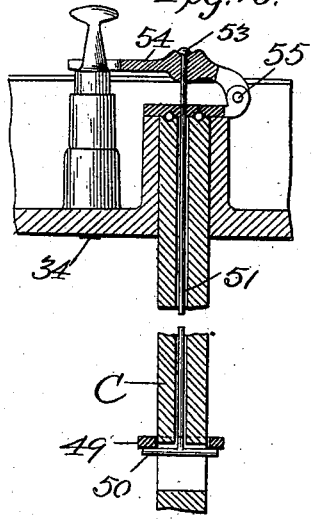
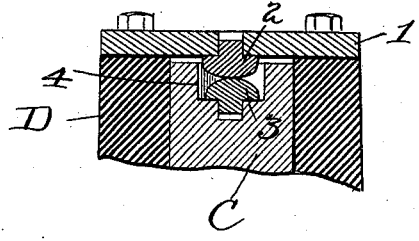
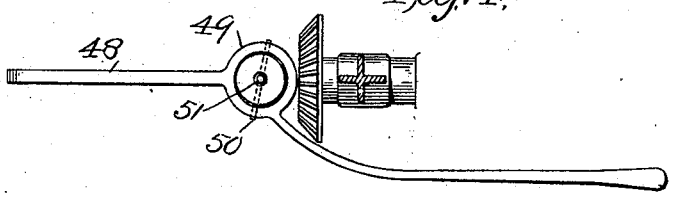
Inventor
Bernard Granville
by Ellis Spear
Atty.

UNITED STATES PATENT OFFICE.

BERNARD GRANVILLE, OF PROVIDENCE, RHODE ISLAND.

WIRE-DRAWING MACHINE.

SPECIFICATION forming part of Letters Patent No. 670,424, dated March 26, 1901.

Application filed February 26, 1900. Serial No. 6,610. (No model.)

*To all whom it may concern:*

Be it known that I, BERNARD GRANVILLE, a citizen of the United States, residing at Providence, Rhode Island, have invented certain new and useful Improvements in Wire-Drawing Machines, of which the following is a specification.

My invention is an improvement in wire-drawing benches, and I provide a unit or an element which may be used in any desired number to form a complete bench, each unit being driven from the same shaft and said units being arranged side by side.

My invention relates to an arrangement of tongs and controlling mechanism whereby the movement of the tongs is automatically arrested when the wire has been drawn through the die far enough to secure proper engagement with the clamps of the drawing-drum. These tongs are operated by a chain, and the construction and arrangement of the operating mechanism are such that the tongs will begin to move slowly in starting the wire through the die, and this movement will gradually increase toward the end of the movement of the tongs. I provide special means for sustaining the weight of the winding-drum by which undue wear is prevented and the drum is maintained in proper relation to the various parts. I provide also a special form of clutch for controlling the drum, and in doing so I am enabled to maintain the drum in its proper position relative to the table instead of, as has heretofore been done, raising the drum when the same is to be unclutched, which has the effect of presenting an opening between the table and the drum in which the wire was liable to be caught.

In controlling the drum I utilize the force of the driving power to release the drum from the clutch when the motion of the drum is to cease, so that in case of any accident due to tangling of the wire or the catching of any object in the wire the attendant by simply manipulating a lever will cause the clutch to be disengaged by the power of the machine through contacting cam-surfaces carried by the drum and the lever mechanism on the frame. As long as the frictional resistance on the clutch does not equal the transmitting power of the gearing or of the driving-shafts the clutch will be compelled to disengage itself by reason of the disengaging cams coming in contact with each other. In this drum-controlling mechanism I aim also to provide such an arrangement by which the drum will be automatically released when it is relieved of pressure or resistance—as, for instance, when the wire breaks. This will prevent the loose wire from being carried around rapidly by the drum to the extreme danger of the attendant and to the detriment of the work itself. With the drum-controlling mechanism I also combine a brake device which will arrest the drum when the same is released from its driving connections.

In the accompanying drawings I have shown my invention in Figure 1 in front view; and in Fig. 2 I show a side elevation, partly in section, of one of the units going to make up the complete bench. Fig. 3 is a plan view of Fig. 2. Fig. 4 is a bottom perspective view of the clutch or transmitting block for the drawing-drum. Fig. 5 is a perspective view of the upper side of the clutch-block. Figs. 6, 7, and 8 are perspective views relating to a step or thrust bearing for sustaining the weight of the drum, its shaft, and other parts. Fig. 9 is a detail side view of a clutch mechanism for controlling the operation of the tongs. Fig. 10 is a detail plan view of parts shown in Fig. 9. Fig. 11 is a sectional view showing the arrangement of drawing-drum and the clutch or transmitting mechanism for imparting rotary movement thereto. Fig. 12 is a detail sectional view of the manner of supporting the drum on its shaft. Fig. 13 is a detail view showing means whereby the clutch-pin may be controlled. Fig. 14 is a plan view of the parts shown in Fig. 13. Fig. 15 is a view of a detail.

The units going to make up the bench comprise each a framework A, having a bearing for a line-shaft B, which is common to all the units. This line-shaft has a beveled gear $b$ for each unit, meshing with a horizontal bevel-gear $c$ on an upright transmitting-shaft C, journaled in bearings $d$ in the frame. These bearings have box-covers, which when removed will permit the removal of the shaft. The shaft at its upper end supports the drawing-drum D, the said drum surrounding the shaft, but having no direct driving connection therewith, this connection being provided by way of controlling and transmitting mechanism, hereinafter described. The drum has a plate 1 extending across the upper end of the opening therein for the shaft C, Fig. 12, and this plate is bolted to the upper surface of the hub or central portion of the drum, and this plate carries centrally a hardened-steel point 2, having a rounded bearing-surface. This point rests upon a similar point 3, carried in a counterbored opening 4 in the end of the shaft. This opening provides an oil-cup. About midway of the shaft a shoulder 5 is provided, Fig. 2, against which is shrunk a hardened and ground steel collar 6, which rests upon brasses 6', carried in a cup 7, Figs. 2, 6, and 7, which rests upon one of the journal-boxes $d$ of the shaft, said cup having ribs 8, which retain the brasses in place, and the said brasses being of semicircular form and provided with end projections 9, which keep the brasses from turning in the cup. The cup is prevented from turning by means of lugs 10, embracing a standard 11, forming part of the frame, as shown in Fig. 2.

This construction provides a bearing to sustain the weight of the drum and upper parts.

Above the cup a beveled pinion 12 is fixed on the shaft C, and this meshes with a pinion 13 on a horizontal shaft 14, which is journaled in the standard 11 and in the side of the main frame A. On this shaft a chain-drum 15 is arranged, to which is connected a chain 16, which extends thence about a pulley at 17 to a pair of tongs 18, arranged above the bench or table 19. These tongs grip the wire and draw it through the die F, which is supported in a block G, mounted on the bench. The chain-drum is loose on the shaft 14 and is controlled by a clutch, a member 20 of which slides on a boss 21, fixed on the shaft, said boss having exterior ribs or shoulders adapted to fit against interior ribs or shoulders formed on the clutch member. These shoulders extend longitudinal of the parts, and as they are at a distance from the center of the shaft equal gripping tension, with less sliding friction increasing in ratio from the center, is insured. The clutch is thrown in to turn the chain-wheel by means of a lever 22, arranged to be operated by the foot at about the level of the floor 23. The turning of the chain-drum winds the chain and draws upon the tongs to draw the wire through the die. The motion of the tongs is slow at first, but increases gradually as the chain winds upon itself upon the chain-wheel. In order to throw the clutch out of action automatically when the tongs have drawn sufficient wire through the die to enable it to be secured to the winding-drum D, I provide a spur 24, Figs. 1 and 9, on the chain adapted to strike against or near the joint 25 of toggle-arms 26 27. One of these toggle-arms is pivoted to the main frame, and the other is pivotally connected to a lug 28 on the clutch-lever 22. By this arrangement when the spur presses upon the toggle-arms they are straightened and the lever 22 is operated to unclutch the parts and stop the operation of the chain-drum. A set-screw 29, passing through a boss on the main frame, limits the movement of the toggle-arms. The wire having been drawn through the die by the tongs is fastened to the drum by means of clamping-jaws 30, Fig. 2.

The transmitting and controlling mechanism for the drawing-drum comprises a block 31, secured rigidly on the upright shaft C, directly below the drum, and having shoulders 32 33, with hardened-steel bearing-surfaces 33', against which may bear a pin 34, carried by the drum, as indicated in Figs. 4, 5, and 11 and dotted lines in Fig. 3. This pin is normally pressed upwardly by a spring 35, and its lower end passes through a hardened-steel block 36, secured within a cavity in the lower surface of the drum. The pin 34 has a handle at its upper end, so that the attendant by pressing down upon this can move the lower end of the pin into the path of the shoulder 32, so that the pin and drum will be carried around with the constantly-rotating block 31, the pressure between the engaging surfaces being sufficient to hold the pin down against the tension of its spring. The block 31 is formed with a guide-rib 36', Figs. 3 and 5, upon which the lower end of the pin 34 rides when depressed, and levers 37, pivoted to the block 31, are so arranged that their upper surfaces form continuations of the guide-ribs. These levers 37 are pressed upwardly by means of springs 37', and when the pin 34 is forced downwardly they simply yield to the pressure and remain down while the drum is being driven through contact between the shoulders 32 or 33 and the pin. As before stated, the pressure at this point is sufficient to hold the parts in contact and keep the pin down, this being due to the resistance of the work being done. For the same reason the lever 37, which tends constantly to lift the pin, has no such effect until there is a sudden relieving of the pressure and resistance due, for instance, to the breaking of a wire, when the drum will run ahead slightly of the block 31, and the pressure at the contact-surface being reduced the spring 35 and the upwardly-spring-pressed lever 37 will immediately lift the pin 34, and thus the drum will quickly come to rest. This action is important, as by this means the drum is prevented from carrying around the loose wire, which is both dangerous to the attendant and destructive to the product.

In order to utilize the power of the machine to control the transmitting connections in stopping the drum from rotating, I provide hand-operated throw-out levers 40, which are pivotally connected at 41, Figs. 2 and 3, and extend to the front and rear of the bench through slots 40' in the frame side. The pivot-pin of these levers extends downwardly and is guided between ribs 42 on the main frame. The levers are pivoted to arms 43, which are pivoted to the main frame at 44. These arms extend on each side of the block 31 and are drawn toward each other by a spring 45. They carry cam projections 46, Fig. 11, and when they are thrown inwardly or toward each other by operating the hand-levers 40 the cam projections are moved into the path of the curved downwardly-projecting ends of the levers 37, Figs. 4, 5, and 11, and thus these levers are positively moved upwardly, and thus raise the pin 34 out of contact with the shoulders 32. It will be seen by this construction that the transmitting connections to the drum D are directly controlled in their operation by the driving power, and should the resistance increase the effectiveness of the throw-out connections will not be lessened, as the driving force will readily overcome any increase of this character. It will thus be seen that the throwing out of the drum does not depend upon any manual force applied, and this is an advantage in the operation of the machine, as in some machines the resistance has at times increased to such an extent as to render manual or foot force insufficient, and particularly in the case of accidents in which the wire becomes entangled or some object or attendant becomes caught.

The levers 40 when in the position of Fig. 3 hold the arms 43 in position to operate the levers 37; but when these levers are set straight or coincident with each other the arm 43 will be separated to prevent contact with the levers 37.

I have shown in the drawings how the units are placed side by side to form the bench. Any unit may be taken out or replaced at will. They are bolted together, blocks of wood or other material being interposed between them.

From the above it will be noticed that the drawing-drum is maintained in one position relative to the drawing-bench, and thus there is no opening left between these parts in which the wire may catch. In order to operate the pin 34 more conveniently, I may provide a lever 48, pivoted to the frame, having an enlarged central opening at 49 and surrounding the shaft C. The shaft is slotted to admit the passage of a pin 50, which extends under the enlarged part of the lever. The pin is connected with a rod 51, extending vertically through an opening in the shaft, and at its upper end this rod has a head 53, resting in a socket of a lever 54, pivoted at 55 to the drum, its other end passing through the handle of the pin 34. By pressing down upon the lever 48 the lever 54 is operated to force down the pin 34.

When the drum D is released from the driving-clutch, it is desirable to arrest the rotation of the drum, and for this purpose I provide brake-levers 60, pivoted to the frame at 62 and connected by links 61 with the arms 43, so that as these arms are thrown inwardly to cause the operation of the parts 37 and the clutch-pin 34 the shoes of the brakes will be brought against the brake-surface 63 of the drum and arrest the action of the same.

The end of the pin 34 is rectangular in cross-section, and it may be turned to bring either of its flat surfaces against a shoulder 32 or 33 of the driving-block.

It will be noticed that the standard of each unit is adapted to rest upon a sill or base z. There is a separate sill or base for each unit, and each sill carries a bearing for the line-shaft. The standards are bolted to the sills, and each unit can be removed from its sill or secured thereto at will without interfering in any way with the line-shaft or with the bearings thereof.

I claim—

1. In combination, in a wire-drawing machine, a self-sustaining unit consisting of a standard extending transversely of the driving-shaft, a vertical shaft carried by the standard, a vertical drum and a table extending transversely of and to each side of the standard, each unit carrying its own table, substantially as described.

2. In combination, the drawing-drum, the supporting-frame, the upright shaft for the drawing-drum, a cup having ribs therein and brasses having projections 9, substantially as described.

3. In combination, the drum the upright shaft having a shoulder, and a bearing for said shoulder, said bearing having a lug engaging part of the frame to prevent turning, substantially as described.

4. In combination in a wire-drawing machine, the drawing-tongs, means for operating the tongs, a connection between said means and the tongs, a clutch for controlling said means, a throw-out device and means carried by said connection for operating said throw-out device, substantially as described.

5. In combination in a wire-drawing machine, the tongs, and means for operating the same, said means giving the tongs an increasing movement toward the end of their course, substantially as described.

6. In combination, the tongs, the chain connected therewith, a winding-drum connected with the chain, and means for driving the winding-drum, the said chain being arranged to wind upon itself and thus increase the speed of movement of the tongs toward the end of its course, substantially as described.

7. In combination, the tongs, a winding-drum, a flexible connection between the same and the tongs, a clutch controlling the winding-drum and throw-out connections controlled by a projection on the flexible connection, substantially as described.

8. In combination in a wire-drawing machine, the tongs, a winding-drum, a flexible connection between them, a clutch, a clutch-lever, toggle-arms for operating the clutch-lever, said toggle-arms being operated by a projection on the flexible connection, substantially as described.

9. In combination, a drawing-drum, a shaft, a clutch connection between the same and the drawing-drum, and means for throwing said clutch out of operation, said means being movable horizontally into and out of the path described by parts of the clutch whereby when in said path the power of the machine will cause the clutch to be thrown out of operation substantially as described.

10. In combination, a drawing-drum, a shaft, a clutch connection between them comprising a pin and a block having a shoulder, a dog or lever engaging the pin, said dog or lever having movement to throw the pin out of engagement with the shoulder, and means arranged to be moved laterally and placed in and out of the path of the dog whereby the driving power of the machine will be utilized to unclutch the parts, substantially as described.

11. In combination, the drum, a shaft for driving the same, a clutch between the shaft and drum, means carried by the frame movable into and out of the path of part of the clutch to operate the same by the power of the machine and a hand-lever whereby the operator may control the said parts, substantially as described.

12. In combination, the drawing-drum, a clutch for driving the same comprising a pin on the drawing-drum, a dog on the clutch-block, an arm movable laterally into and out of the path of the dog and having a projection to operate the same and a hand-lever connected to the arm, substantially as described.

13. In combination, the drawing-drum, an operating-clutch therefor comprising a pin, and means for operating said pin consisting of a rod extending through the shaft of the drum and connections between said rod and pin, and means for operating the rod, substantially as described.

14. In a wire-drawing machine, a plurality of units, each comprising a standard, a drum, driving connections therefor and a table, said table and standard forming an independent T-shaped frame for each unit, said tables being carried by the standards and arranged to abut directly against the tables of adjacent units, substantially as described.

15. In combination, the drawing-drum, a table, a standard, a sill to which the standard is removably secured and which forms the foundation-support for the standard and a driving-shaft and a bearing for the driving-shaft on the sill, substantially as described.

16. In combination, a plurality of units, each of which is composed of a standard and a table forming for each unit an independent T-shaped structure, a series of sills, one for each unit and upon which the standards are supported, a line-shaft and bearings for the line-shaft on the sills, substantially as described.

In testimony whereof I affix my signature in presence of two witnesses.

BERNARD GRANVILLE.

Witnesses:
  JAMES A. PIRCE,
  LUCIUS F. ARNOLD.